(12) United States Patent
Breau et al.

(10) Patent No.: US 8,493,950 B1
(45) Date of Patent: Jul. 23, 2013

(54) ETHERNET BACKHAUL FOR WIRELESS BASE STATIONS

(75) Inventors: Jeremy R. Breau, Leawood, KS (US); Serge M. Manning, Plano, TX (US); Bejoy Pankajakshan, Olathe, KS (US); Mohammed Ghouse Mohiuddin, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 302 days.

(21) Appl. No.: 13/015,704

(22) Filed: Jan. 28, 2011

(51) Int. Cl.
*H04J 3/16* (2006.01)

(52) U.S. Cl.
USPC .......................................................... 370/338

(58) Field of Classification Search
USPC .......................................................... 370/338
See application file for complete search history.

(56) References Cited

U.S. PATENT DOCUMENTS

| 5,649,100 | A  | * | 7/1997  | Ertel et al. ..................... 709/225 |
| 7,031,258 | B1 | * | 4/2006  | Frisch et al. .................. 370/235 |
| 7,058,076 | B1 |   | 6/2006  | Jiang |
| 8,238,889 | B1 | * | 8/2012  | Vu ............................. 455/414.3 |
| 8,249,104 | B2 | * | 8/2012  | Effenberger et al. ......... 370/471 |
| 8,305,963 | B1 | * | 11/2012 | Breau et al. .................. 370/328 |
| 2006/0268888 | A1 | * | 11/2006 | Liu et al. ..................... 370/395.1 |
| 2007/0288997 | A1 | * | 12/2007 | Meier et al. ....................... 726/4 |

FOREIGN PATENT DOCUMENTS

EP      2306666 A1 * 4/2011

* cited by examiner

*Primary Examiner* — Sulaiman Nooristany (57) ABSTRACT

Wireless networks comprise base stations that each have communication ports. The wireless networks exchange media with user devices through the communication ports. The wireless networks are identified by Ethernet OUIs, and the base stations and ports are identified by unique codes. An Ethernet backhaul network exchanges the media in Ethernet frames between the communication ports. The Ethernet backhaul network routes the Ethernet frames based on MAC addresses that indicate a destination OUI, a destination base station code, a destination port code, a source OUI, a source base station code, and a source port code.

14 Claims, 6 Drawing Sheets

FIGURE 6

ETHERNET BACKHAUL FOR WIRELESS BASE STATIONS

TECHNICAL BACKGROUND

In the field of wireless communications, user telephones and network base stations exchange voice data over wireless communication links. The base stations exchange the voice data with one another over a backhaul communication network. Many backhaul networks are packet-based. In a packet-based backhaul network, the voice data is encapsulated in multiple packet wrappers that each include overhead information. The network elements in the packet-based backhaul network read and process the overhead information to route or switch the voice data to the intended destination system.

These packet-based backhaul communications are layered by repeatedly encapsulating the voice data in successive wrappers. In a typical scenario, a block of voice data is first encapsulated in a Real Time Protocol (RTP) wrapper with an RTP header. The RTP header includes a sequence number and a time stamp, among other information suitable for media streaming. The RTP wrapper is encapsulated in a User Datagram Protocol (UDP) wrapper having a UDP header. The UDP header includes destination and source ports, data length indicator, and checksum. The UDP wrapper is encapsulated in an Internet Protocol (IP) wrapper with an IP header. The IP header includes destination and source addresses, Diffserv marker, congestion notification, and other information suitable for packet processing.

The IP wrapper is encapsulated in an Ethernet frame. The Ethernet frame includes destination and source Media Access Control (MAC) addresses that are used for routing the Ethernet frame across an Ethernet switching system. Each of these MAC addresses is six octets in length. The typical syntax for depicting an Ethernet MAC address is AA:BB:CC:DD:EE:FF where each pair of letters represents one of the octets. The first three octets (AA:BB:CC) specify an Organizationally Unique Identifier (OUI). Organizations may obtain their own OUI from the IEEE. The last three octets (DD:EE:FF) are unique to the Network Interface Card (NIC) in the respective communication transceiver. Thus, last three octets (DD:EE:FF) are unique to a piece of hardware.

OVERVIEW

A set of wireless networks comprise base stations that each have communication ports. The wireless networks exchange media with user devices through the communication ports. The wireless networks are identified by Ethernet OUIs, and the base stations and ports are identified by unique codes. An Ethernet backhaul network exchanges the media in Ethernet frames between the communication ports. The Ethernet backhaul network routes the Ethernet frames based on MAC addresses that indicate a destination OUI, a destination base station code, a destination port code, a source OUI, a source base station code, and a source port code.

DETAILED DESCRIPTION

Figure 1:
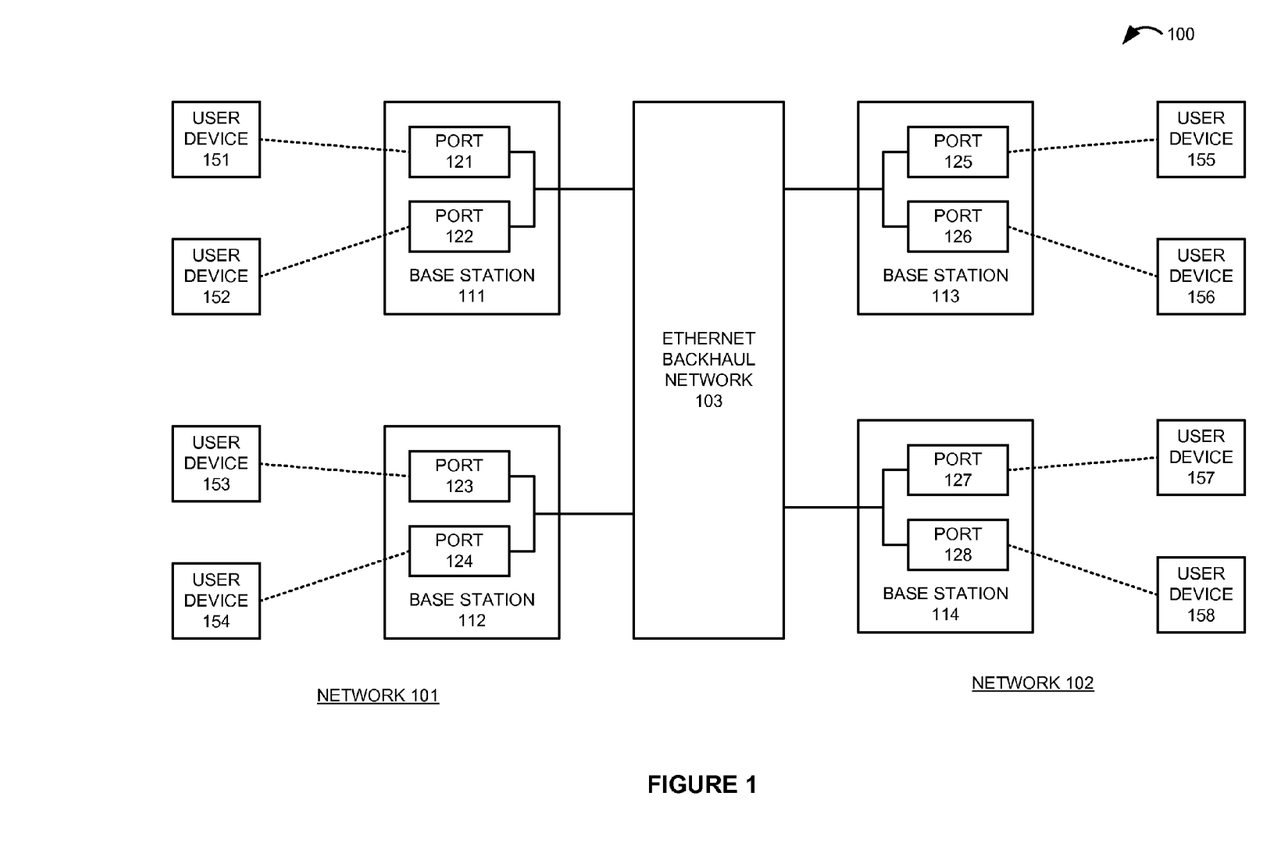
FIG. 1 illustrates an Ethernet backhaul system that indicates wireless networks, base stations, ports, sequence numbers, and codec types in Ethernet MAC addresses.

FIG. 1 illustrates Ethernet backhaul system 100 that indicates wireless networks, base stations, ports, sequence numbers, and codec types in Ethernet MAC addresses. Ethernet backhaul system 100 comprises wireless access network 101, wireless access network 102, and Ethernet backhaul network 103. Wireless access network 101 comprises base stations 111-112 and user devices 151-154. Base station 111 includes ports 121-122. Base station 112 includes ports 123-124. Wireless access network 102 comprises base stations 113-114 and user devices 155-158. Base station 113 includes ports 125-126. Base station 114 includes ports 127-128. Note that the number of user devices, base stations, and ports have been restricted for clarity of illustration. Also note that user devices 151-158 may move around and communicate wirelessly through various other base stations and/or ports.

Wireless access network 101 has its own Ethernet OUI. Likewise, wireless access network 102 has its own Ethernet OUI. If an Ethernet frame has the OUI for network 101 in its destination MAC address, then Ethernet backhaul network 103 transfers the Ethernet frame to access network 101. If an Ethernet frame has the OUI for network 102 in its destination MAC address, then Ethernet backhaul network 103 transfers the Ethernet frame to access network 102.

Base stations 111-112 each have a base station code that is unique within their own respective access network. The base station codes are included in the Ethernet MAC addressing to control Ethernet frame routing. For example, if an Ethernet frame has the OUI for network 101 and the code for base station 111 in its destination MAC address, then Ethernet backhaul network 103 transfers the Ethernet frame to base station 111 in access network 101. If an Ethernet frame has the OUI for network 102 and the code for base station 114 in its destination MAC address, then Ethernet backhaul network 103 transfers the Ethernet frame to base station 114 in access network 102.

Ports 121-128 each have a port code that is unique within their own respective base station. The port codes are also included in the Ethernet MAC addressing to control Ethernet frame routing. For example, if an Ethernet frame has the OUI for network 101, the code for base station 111, and the code for port 122 in its destination MAC address, then Ethernet backhaul network 103 transfers the Ethernet frame to port 122 in base station 111 in access network 101. If an Ethernet frame has the OUI for network 102, the code for base station 114, and the code for port 127 in its destination MAC address, then Ethernet backhaul network 103 transfers the Ethernet frame to port 127 in base station 114 in access network 102.

Ethernet backhaul network 103 maintains a routing data structure that correlates wireless network OUIs, base station codes, and port codes to Ethernet frame routing instructions. User devices 151-158 request media sessions, and a control system in network 103 selects available wireless links and ports for the sessions. User devices 151-158 exchange media with the selected ports 121-128 over the selected wireless links.

Ports 121-128 exchange the media in Ethernet frames over Ethernet backhaul network 103. The Ethernet frames are routed based on MAC addresses that are made of data components that correlate to the pertinent wireless network, base station, and port information. On a voice call from user device 151 to user device 154, port 121 and port 124 exchange voice data in Ethernet frames over Ethernet backhaul network 103. The Ethernet frames from port 121 to port 124 would have a destination MAC address as follows:

| OUI FOR WIRELESS NETWORK 101 | | | CODE FOR BASE STATION 112 | CODE FOR PORT 124 | SEQUENCE NUMBER |
|---|---|---|---|---|---|
| OCTET #1 | OCTET #2 | OCTET #3 | OCTET #4 | OCTET #5 | OCTET #6 |

These Ethernet frames from port 121 to port 124 would have a source MAC address as follows:

| OUI FOR WIRELESS NETWORK 101 | | | CODE FOR BASE STATION 111 | CODE FOR PORT 121 | CODE FOR CODEC TYPE |
|---|---|---|---|---|---|
| OCTET #1 | OCTET #2 | OCTET #3 | OCTET #4 | OCTET #5 | OCTET #6 |

In the reverse direction, the Ethernet frames from port 124 to port 121 would have a destination MAC address as follows:

| OUI FOR WIRELESS NETWORK 101 | | | CODE FOR BASE STATION 111 | CODE FOR PORT 121 | SEQUENCE NUMBER |
|---|---|---|---|---|---|
| OCTET #1 | OCTET #2 | OCTET #3 | OCTET #4 | OCTET #5 | OCTET #6 |

These Ethernet frames from port 124 to port 121 would have a source MAC address as follows:

| OUI FOR WIRELESS NETWORK 101 | | | CODE FOR BASE STATION 112 | CODE FOR PORT 124 | CODE FOR CODEC TYPE |
|---|---|---|---|---|---|
| OCTET #1 | OCTET #2 | OCTET #3 | OCTET #4 | OCTET #5 | OCTET #6 |

On a voice call from user device 151 to user device 158, port 121 and port 128 exchange voice data in Ethernet frames over Ethernet backhaul network 103. The Ethernet frames from port 121 to port 128 would have a destination MAC address as follows:

| OUI FOR WIRELESS NETWORK 102 | | | CODE FOR BASE STATION 114 | CODE FOR PORT 128 | SEQUENCE NUMBER |
|---|---|---|---|---|---|
| OCTET #1 | OCTET #2 | OCTET #3 | OCTET #4 | OCTET #5 | OCTET #6 |

These Ethernet frames from port 121 to port 128 would have a source MAC address as follows:

| OUI FOR WIRELESS NETWORK 101 | | | CODE FOR BASE STATION 111 | CODE FOR PORT 121 | CODE FOR CODEC TYPE |
|---|---|---|---|---|---|
| OCTET #1 | OCTET #2 | OCTET #3 | OCTET #4 | OCTET #5 | OCTET #6 |

In the reverse direction, the Ethernet frames from port 128 to port 121 would have a destination MAC address as follows:

| OUI FOR WIRELESS NETWORK 101 | | | CODE FOR BASE STATION 111 | CODE FOR PORT 121 | SEQUENCE NUMBER |
|---|---|---|---|---|---|
| OCTET #1 | OCTET #2 | OCTET #3 | OCTET #4 | OCTET #5 | OCTET #6 |

These Ethernet frames from port 128 to port 121 would have a source MAC address as follows:

| OUI FOR WIRELESS NETWORK 102 | | | CODE FOR BASE STATION 114 | CODE FOR PORT 128 | CODE FOR CODEC TYPE |
|---|---|---|---|---|---|
| OCTET #1 | OCTET #2 | OCTET #3 | OCTET #4 | OCTET #5 | OCTET #6 |

Figure 2:
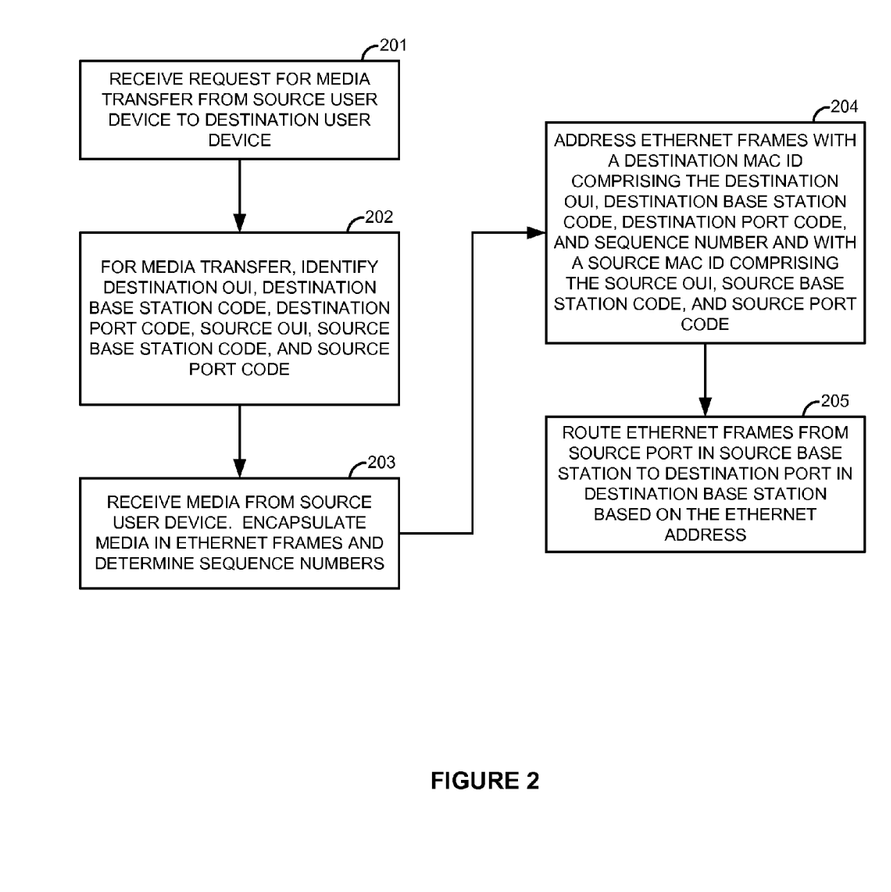
FIG. 2 illustrates the operation of the Ethernet backhaul system to indicate wireless networks, base stations, ports, sequence numbers, and codec types in Ethernet MAC addresses.

FIG. 2 illustrates the operation of Ethernet backhaul system 100. A computerized control system in Ethernet backhaul system 100 receives a request for a media transfer from a source user device to a destination user device (201). For example, one of the users may place a voice call to another user. For the transfer, the control system identifies a destination OUI, destination base station code, and destination port code (202). Typically, this entails identifying the base station that is currently serving the destination device, and then selecting an available port and suitable codec type for the destination. The control system also identifies a source OUI, source base station code, and source port code (202). Typically, this entails identifying the base station that is currently serving the source device, and then selecting an available port and suitable codec type for the source. The codec type identifies the coding and decoding scheme for the media, such as G.729 or G.711 for voice. The control system transfers this information to the applicable base stations.

The source base station receives media from the source user device and encapsulates the media in Ethernet frames (203). A sequence number is added to sequentially identify each Ethernet frame relative to the other Ethernet frames in the order of the media stream (203). The sequence numbers could be a modulo count for successive frames. The source base station also addresses the frames with the identified source and destination MAC addresses that indicate the selected networks, base stations, ports, and codec type (204). The source base stations transfers the Ethernet frames to the Ethernet backhaul network, and the Ethernet network routes the frames to the destination base station and port based on the source and destination MAC addresses (205).

To allow for effective routing, the wireless networks each have a unique OUI. The base stations in each wireless network are individually identified by codes that are unique within their given network. Likewise, the communication ports are individually identified by codes that are unique within each respective base station. Also note that the media is encapsulated by the Ethernet frames, but the media is not encapsulated by internet protocol packets and/or by real time protocol packets.

Figure 3:
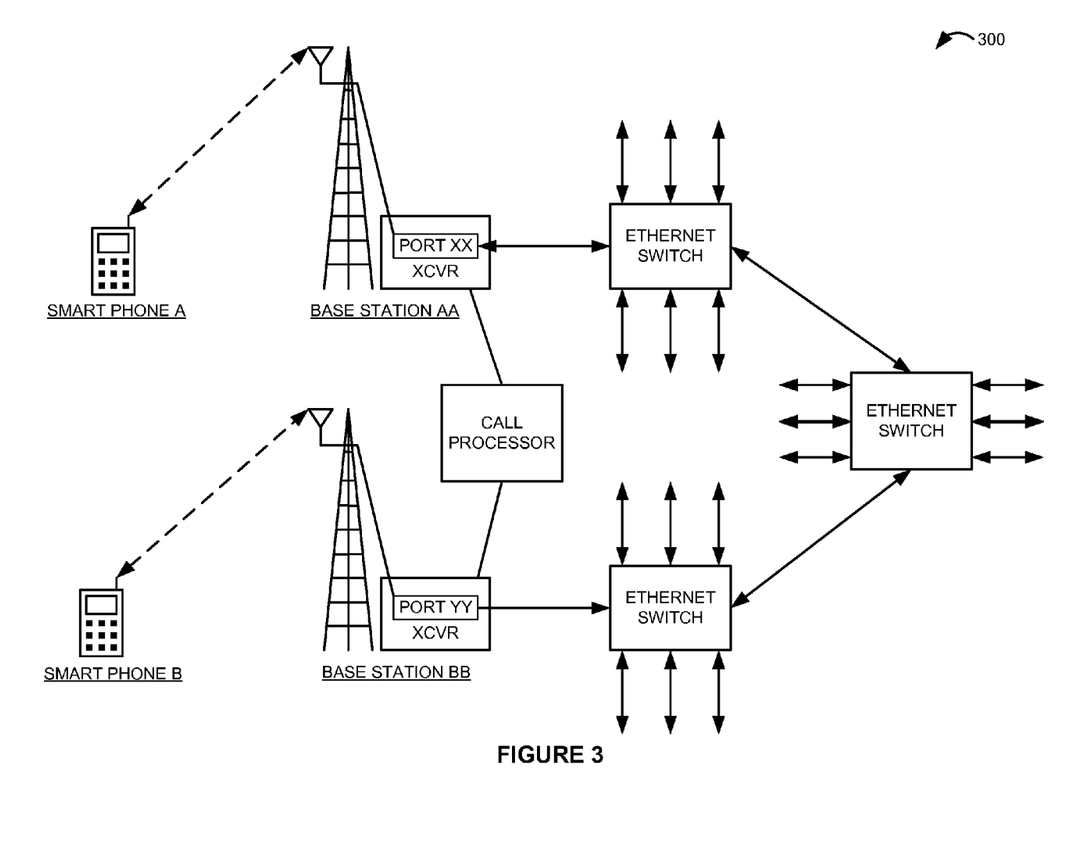
FIG. 3 illustrates an Ethernet backhaul system that indicates wireless networks, base stations, ports, sequence numbers, and codec types in Ethernet MAC addresses.

FIG. 3 illustrates Ethernet backhaul system 300. Ethernet backhaul system 300 includes wireless smart phones, base stations, Ethernet switches, and a call processor that are linked together. The smart phones wirelessly exchange voice and/or video media with the antennas on the base stations. The transceivers in the base stations include multiple ports (although only one is shown for clarity) that exchange the media over the Ethernet switching fabric. For a given media session between phones, the call processor selects the Ethernet addresses and communicates these selections to the appropriate base station transceivers. The Ethernet switching fabric is configured to route Ethernet frames based on the OUIs, base station codes, and port codes in the MAC addresses.

Figure 4:
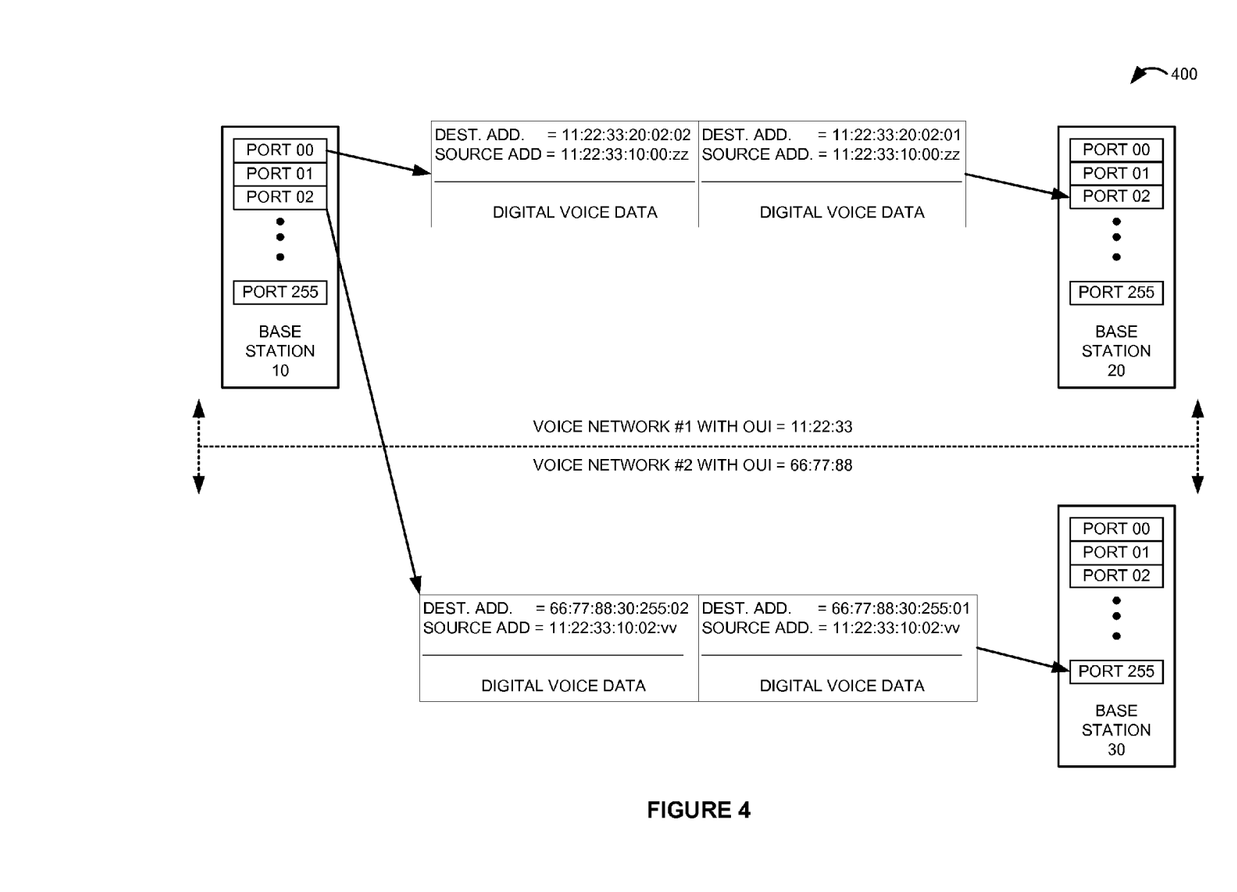
FIG. 4 illustrates an Ethernet backhaul system for multiple voice networks.

FIG. 4 illustrates Ethernet backhaul system 400 for multiple voice networks. Ethernet backhaul system 400 includes base stations 10 and 20 in voice network #1 and base station 30 in voice network #2. Each base station has 256 ports (0-255). The number of base stations has been restricted for illustrative purposes, but there could be up to 256 base stations in each voice network, and new voice networks could be created with a new OUI if the existing networks reach the maximum number of base stations. Note that the voice networks could also be allocated to different access technologies. For example, voice network #1 could use code division multiple access technology, while voice network #2 could use wireless fidelity access technology.

Consider a voice call within voice network #1 from port 0 of base station 10 to port 2 of base station 20. Voice network #1 has an OUI of 11:22:33, so both source and destination MAC addresses use this OUI. After the OUI of 11:22:33, the destination MAC addresses for this call have 20:02 for destination base station 20 and port 02. After the OUI of 11:22:33, the source MAC addresses for this call have 10:00 for source base station 10 and port 00. Note the sequence numbers of 01 and 02 at the end of the destination MAC address. Also note the codec code zz at the end of the source address. The code zz could represent a specific type of G.711 coding or some other voice coding scheme. A media transfer from base station 20 to base station 10 may also occur on the session in reciprocal fashion.

Now consider a voice call from voice network #1 with an OUI of 11:22:33 to voice network #2 with an OUI of 66:77:88. The call is from port 02 of base station 10 to port 255 of base station 30. The destination MAC address is 66:77:88:30:255 for the destination network, base station, and port. Sequence numbers 01, 02 . . . are at the end of the destination address. The source MAC address is 11:22:33:10:02 for the source network, base station, and port. Note the codec type of vv at the end of the source MAC address.

Figure 5:
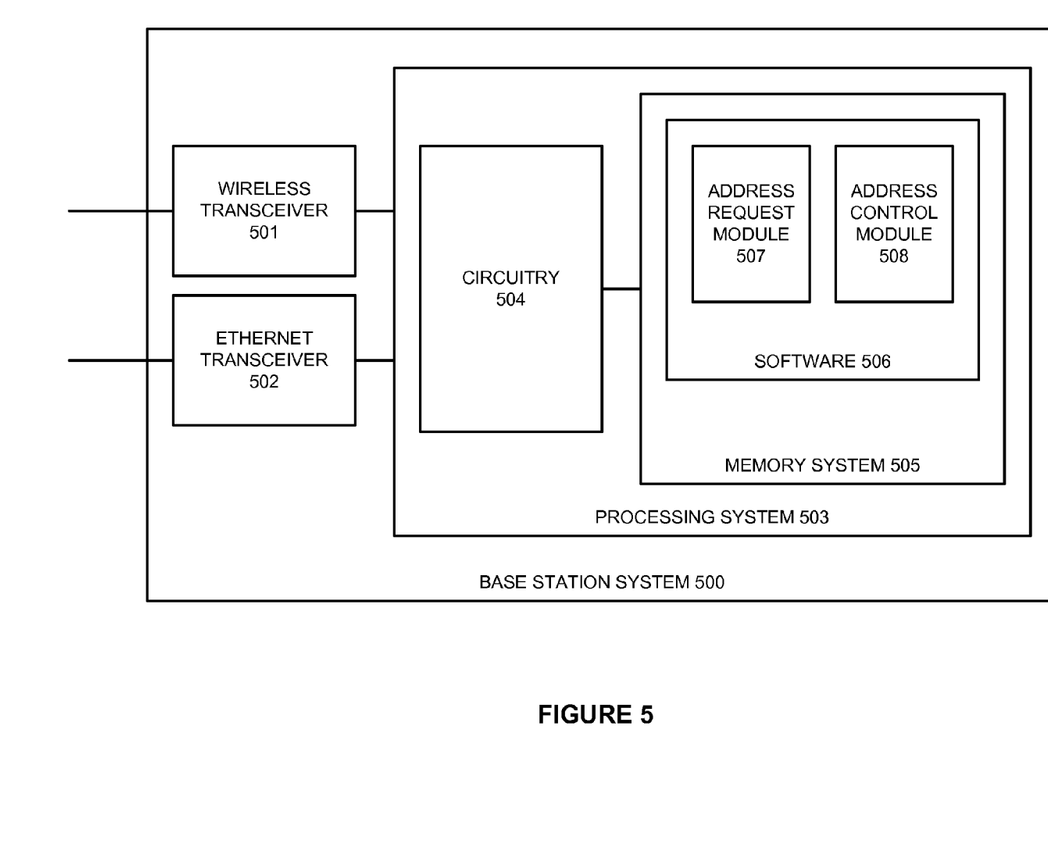
FIG. 5 illustrates a base station system.

FIG. 5 illustrates base station system 500. Base station system 500 provides an example of base stations 111-114, 10, 20, and 30, although these stations may use alternative configurations. Base station system 500 comprises wireless transceiver 501, Ethernet transceiver 502, and processing system 503. Processing system 503 is linked to transceivers 501-502. Processing system 503 includes processing circuitry 504 and memory system 505 that stores operating software 506. Operating software 506 comprises software modules 507-508.

Wireless transceiver 501 comprises components that communicate over wireless links, such as antennas, amplifiers, RF processing circuitry and software, and/or some other communication components. Wireless transceiver 501 may be configured to use Code Division Multiple Access (CDMA) 1x RTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Bluetooth, or some other wireless network protocol. Wireless transceiver 501 is configured to wirelessly exchange media and signaling with user devices.

Ethernet transceiver 502 comprises components that communicate over Ethernet links, such as network cards, ports, RF transceivers, processing circuitry and software, or some other communication components. Ethernet transceiver 502 may be configured to communicate over metallic, wireless, or optical links. Ethernet transceiver 502 exchanges media and signaling with other Ethernet transceivers in network control systems and Ethernet switches.

Processing circuitry 504 comprises microprocessor and other circuitry that retrieves and executes operating software 506 from memory system 505. Memory system 505 comprises a non-transitory storage medium, such as a disk drive, flash drive, data storage circuitry, or some other memory apparatus. Operating software 506 comprises computer programs, firmware, or some other form of machine-readable processing instructions. Operating software 506 may include an operating system, utilities, drivers, network interfaces, applications, or some other type of software. In this example, operating software 506 also comprises software modules 507-508, although software 506 could have alternative configurations in some examples.

When executed by processing circuitry 504, operating software 506 directs processing system 503 to operate as described herein for Ethernet routing. In particular, address request module 507 requests MAC addressing information from call processors or some other control systems. Address control module 508 processes the MAC addressing information from the call processors or other control systems to address outgoing Ethernet frames.

Figure 6:
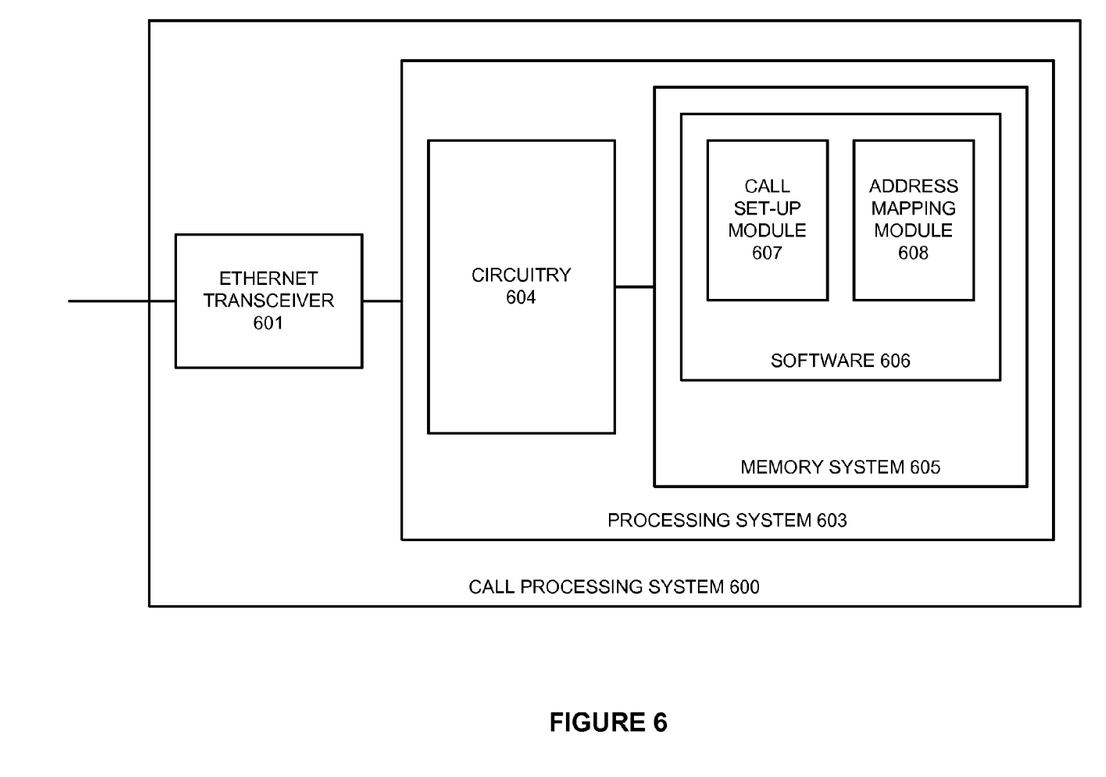
FIG. 6 illustrates a call processing system.

FIG. 6 illustrates call processing system 600. Call processing system 600 provides an example for Ethernet backhaul systems 100, 300, and 400, although these systems may use alternative configurations. Call processing system 600 comprises Ethernet transceiver 601 and processing system 603. Processing system 603 is linked to transceiver 601. Processing system 603 includes processing circuitry 604 and memory system 605 that stores operating software 606. Operating software 606 comprises software modules 607-608.

Ethernet transceiver 601 comprises components that communicate over Ethernet links, such as network cards, ports, RF transceivers, processing circuitry and software, or some other communication components. Ethernet transceiver 601 may be configured to communicate over metallic, wireless, or optical links. Ethernet transceiver 601 exchanges signaling with other Ethernet transceivers in base stations or other network control systems.

Processing circuitry 604 comprises microprocessor and other circuitry that retrieves and executes operating software 606 from memory system 605. Memory system 605 comprises a non-transitory storage medium, such as a disk drive, flash drive, data storage circuitry, or some other memory apparatus. Operating software 606 comprises computer programs, firmware, or some other form of machine-readable processing instructions. Operating software 606 may include an operating system, utilities, drivers, network interfaces, applications, or some other type of software. In this example, operating software 606 also comprises software modules 607-608, although software 606 could have alternative configurations in some examples.

When executed by processing circuitry 604, operating software 606 directs processing system 603 to operate as described herein for Ethernet routing. In particular, call set-up module 607 receives call set-up requests and responds with MAC addressing information. Address mapping module 608 determines the correct MAC addressing information for the source and destination systems on the media session.

Referring back to FIG. 1, user devices 151-158 each comprise Radio Frequency (RF) communication circuitry and an antenna. The RF communication circuitry typically includes an amplifier, filter, modulator, and signal processing circuitry. User devices 151-158 may also include a user interface, memory device, software, processing circuitry, or some other communication components. User devices 151-158 could be telephones, wireless transceivers, computers, digital assistants, e-books, game consoles, mobile Internet devices, wireless network interface cards, media players, or some other wireless communication apparatus including combinations thereof. Wireless network protocols that may be utilized by user devices 151-158 include CDMA, GSM, UMTS, HSPA, EV-DO, EV-DO rev. A, 3GPP LTE, WiMAX, Wi-Fi, Bluetooth, or some other wireless network protocol.

Base stations 111-114 each comprise RF communication circuitry and antennas. The RF communication circuitry typically includes amplifiers, filters, RF modulators, and signal processing circuitry and software. Base stations 111-114 may also comprise routers, servers, memory devices, software, processing circuitry, cabling, power supplies, network communication interfaces, structural supports. Wireless network protocols that may be utilized by base stations 111-114 include CDMA, GSM, UMTS, HSPA, EV-DO, EV-DO rev. A, 3GPP LTE, WiMAX, Wi-Fi, Bluetooth, or some other wireless network protocol.

Ethernet backhaul network 103 comprises Ethernet switches and links. The Ethernet switches include data structures to control Ethernet frame routing based on MAC addressing. The Ethernet switches include communication interfaces, circuitry, memory, and software. Ethernet backhaul network 103 may also include other components such as servers, data storage systems, and power supplies.

The wireless communication links use the air or space as the transport medium. The wireless communication links may use various protocols, such as CDMA, GSM, UMTS, HSPA, EV-DO, EV-DO rev. A, 3GPP LTE, WiMAX, Wi-Fi, Bluetooth, or some other wireless network protocol. The Ethernet links use metal, air, space, optical fiber such as glass or plastic, or some other material as the transport medium— including combinations thereof.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system comprising in a first wireless network having a plurality of first base stations each having a plurality of first communication ports, wirelessly exchanging media with first user devices through the first communication ports, wherein the first wireless network is individually identified by a first Organization Unique Identifier (OUI), wherein each one of the first base stations is individually identified by a base station code that is unique within the first wireless network, and wherein each one of the first communication ports is individually identified by a port code that is unique within the respective one of the first base stations;

in a second wireless network having a plurality of second base stations each having a plurality of second communication ports, wirelessly exchanging media with second user devices through the second communication ports, wherein the second wireless network is individually identified by a second OUI, wherein each one of the second base stations is individually identified by a base station code that is unique within the second wireless network, and wherein each one of the second communication ports is individually identified by a port code that is unique within the respective one of the second base stations; and in an Ethernet backhaul network, exchanging the media in Ethernet frames between the communication ports based on Ethernet Media Access Control (MAC) addresses that indicate a destination OUI, a destination base station code, a destination port code, a source OUI, a source base station code, and a source port code;

wherein the OUIs each comprising of three octets;

wherein the base station codes each comprising of one octet; and wherein the port codes each comprising of one octet.

2. The method of claim 1 wherein the Ethernet MAC addresses each include a destination address of six octets and a source address of six octets.

3. The method of claim 1 wherein the Ethernet MAC addresses indicate sequence numbers for the media.

4. The method of claim 3 wherein the sequence numbers each consist of one octet.

5. The method of claim 1 wherein the Ethernet MAC addresses indicate codec types for the media.

6. The method of claim 1 wherein the media is encapsulated by the Ethernet frames and the media is not encapsulated by internet protocol packets and is not encapsulated by real time protocol packets.

7. The method of claim 1 wherein the media comprises voice data.

8. A wireless communication system comprising:

a first wireless network comprising a plurality of first base stations each comprising a plurality of first communication ports, wherein the first wireless network is configured to wirelessly exchange media with first user devices through the first communication ports, wherein the first wireless network is individually identified by a first Organization Unique Identifier (OUI), wherein each one of the first base stations is individually identified by a base station code that is unique within the first network, and wherein each one of the first communication ports is individually identified by a port code that is unique within the respective one of the first base stations;

in a second wireless network having a plurality of second base stations each having a plurality of second communication ports, wirelessly exchanging media with second user devices through the second communication ports, wherein the second wireless network is individually identified by a second OUI, wherein each one of the second base stations is individually identified by a base station code that is unique within the second network, and wherein each one of the second communication ports is individually identified by a port code that is unique within the respective one of the second base stations; and in an Ethernet backhaul network, exchanging the media in Ethernet frames between the communication ports based on Ethernet Media Access Control (MAC) addresses that indicate a destination OUI, a destination base station code, a destination port code, a source OUI, a source base station code, and a source port code;

wherein the OUIs each comprising of three octets;

wherein the base station codes each comprising of one octet; and wherein the port codes each comprising of one octet.

9. The wireless communication system of claim 8 wherein the Ethernet MAC addresses each include a destination address of six octets and a source address of six octets.

10. The wireless communication system of claim 8 wherein the Ethernet MAC addresses indicate sequence numbers for the media.

11. The wireless communication system of claim 10 wherein the sequence numbers each consist of one octet.

12. The wireless communication system of claim 8 wherein the Ethernet MAC addresses indicate codec types for the media.

13. The wireless communication system of claim 8 wherein the media is encapsulated by the Ethernet frames and the media is not encapsulated by internet protocol packets and is not encapsulated by real time protocol packets.

14. The wireless communication system of claim 8 wherein the media comprises voice data.

* * * * *